United States Patent [19]

Lidkea

[11] 4,066,998
[45] Jan. 3, 1978

[54] METHOD AND APPARATUS FOR DISCRIMINATING BETWEEN CHARACTERS IN CHARACTER RECOGNITION SYSTEMS

[75] Inventor: Harrison B. Lidkea, Satellite Beach, Fla.

[73] Assignee: Optical Business Machines, Inc., Melbourne, Fla.

[21] Appl. No.: 682,026

[22] Filed: Apr. 30, 1976

[51] Int. Cl.$^2$ .............................................. G06K 9/12
[52] U.S. Cl. ................. 340/146.3 AC; 340/146.3 MA
[58] Field of Search .......... 340/146.3 AC, 146.3 MA, 340/146.3 AQ, 146.3 AH, 146.3 ED, 146.3 AE, 146.3 D, 146.3 R

[56] References Cited

U.S. PATENT DOCUMENTS

| | | | |
|---|---|---|---|
| 3,140,466 | 7/1964 | Greanias et al. ............ | 340/146.3 AC |
| 3,182,290 | 5/1965 | Rabinow ..................... | 340/146.3 AQ |
| 3,271,761 | 9/1966 | Kuang-Chi Hu .......... | 340/146.3 AC |
| 3,585,588 | 6/1971 | Hardin et al. .............. | 340/146.3 AH |
| 3,585,592 | 6/1971 | Kiji et al. ................... | 340/146.3 AC |
| 3,613,080 | 10/1971 | Angeloni et al. .......... | 340/146.3 MA |
| 3,639,902 | 1/1972 | Dietrich ...................... | 340/146.3 AC |
| 3,873,972 | 3/1975 | Levine ........................ | 340/146.3 AC |

OTHER PUBLICATIONS

Unger, "Pattern Detection and Recognition," *Proceedings of the IRE,* Oct. 1959, pp. 1737–1751.
Tou et al. "Recognition of Handwritten Characters by Topological Feature Extraction," *IEEE Trans. on Computers,* July, 1972, pp. 776–785.

*Primary Examiner*—Leo H. Boudreau
*Attorney, Agent, or Firm*—Rose & Edell

[57] ABSTRACT

Recognition of characters, particularly handwritten characters, is facilitated by examining a character for holes (i.e. non-character portions enclosed by character portions), split characters (i.e. disconnected character segments), overhangs and underhangs (i.e. extensions of character segments to the left or right of other segments). In a specific embodiment a character to be recognized is quantized into a grid of vertical column and horizontal rows and then shifted in parallel by column, serially by row through a recognition mask which examines one row at a time. Results of the examination may be used either as positive character recognition or as pre-recognition exclusionary information to resolve possible ambiguities in conventional recognition processes.

13 Claims, 18 Drawing Figures

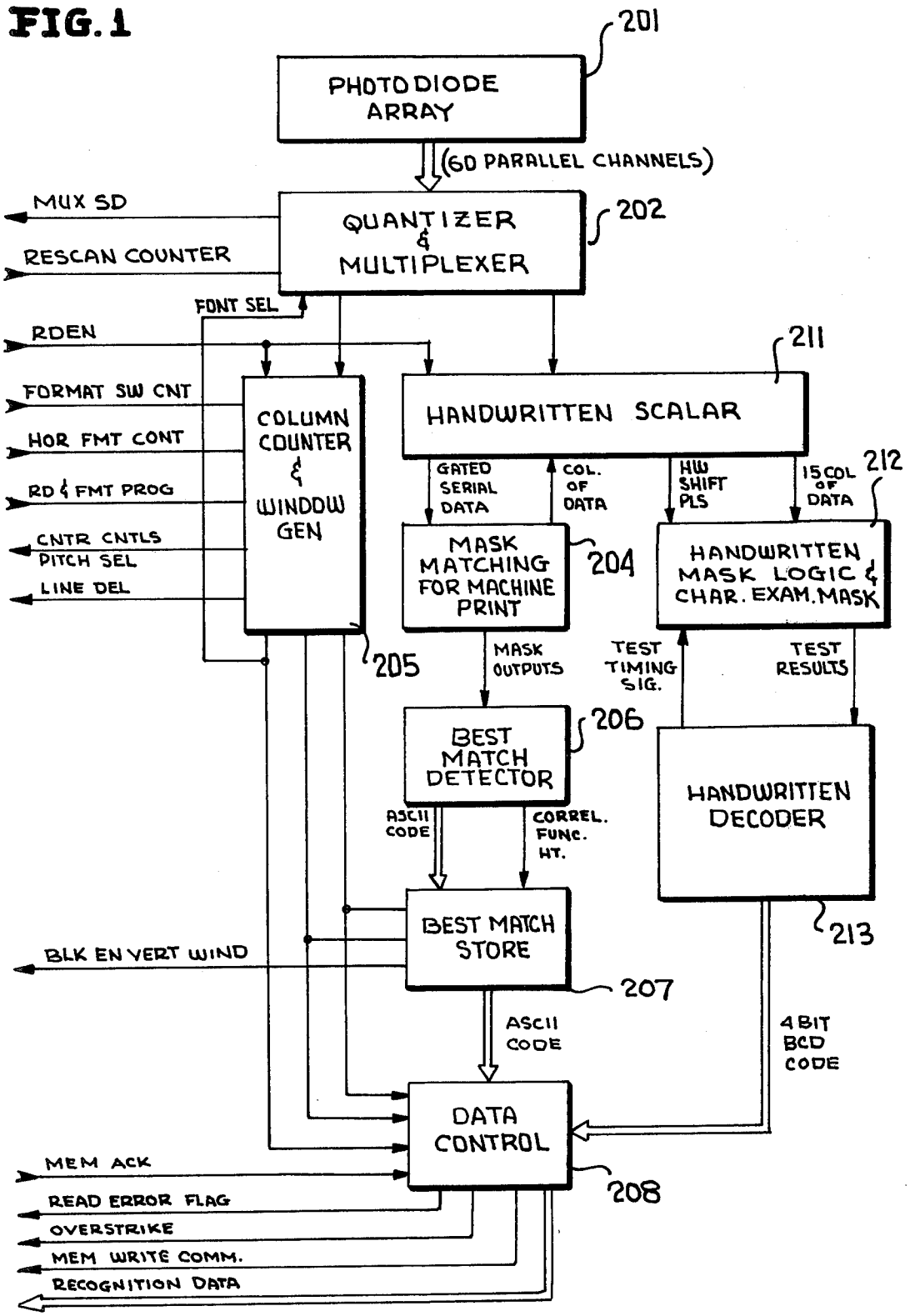

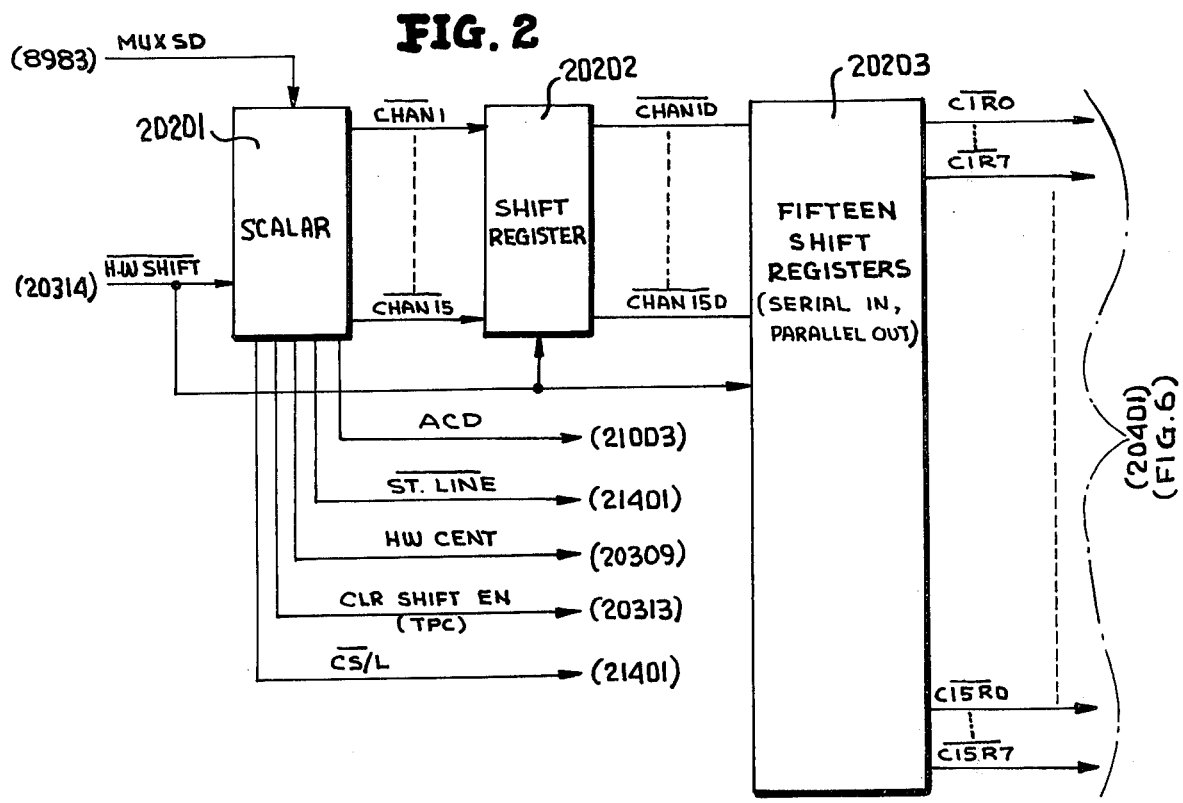
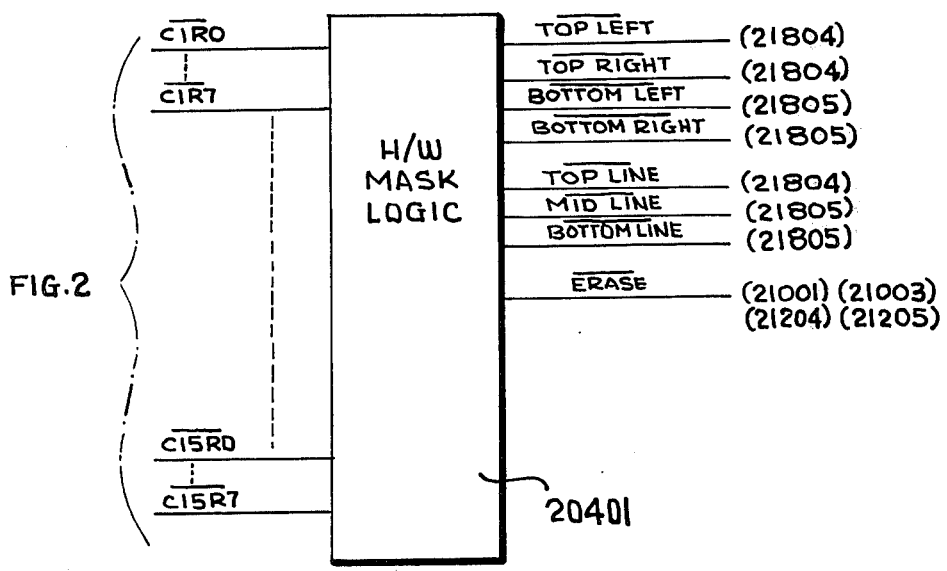

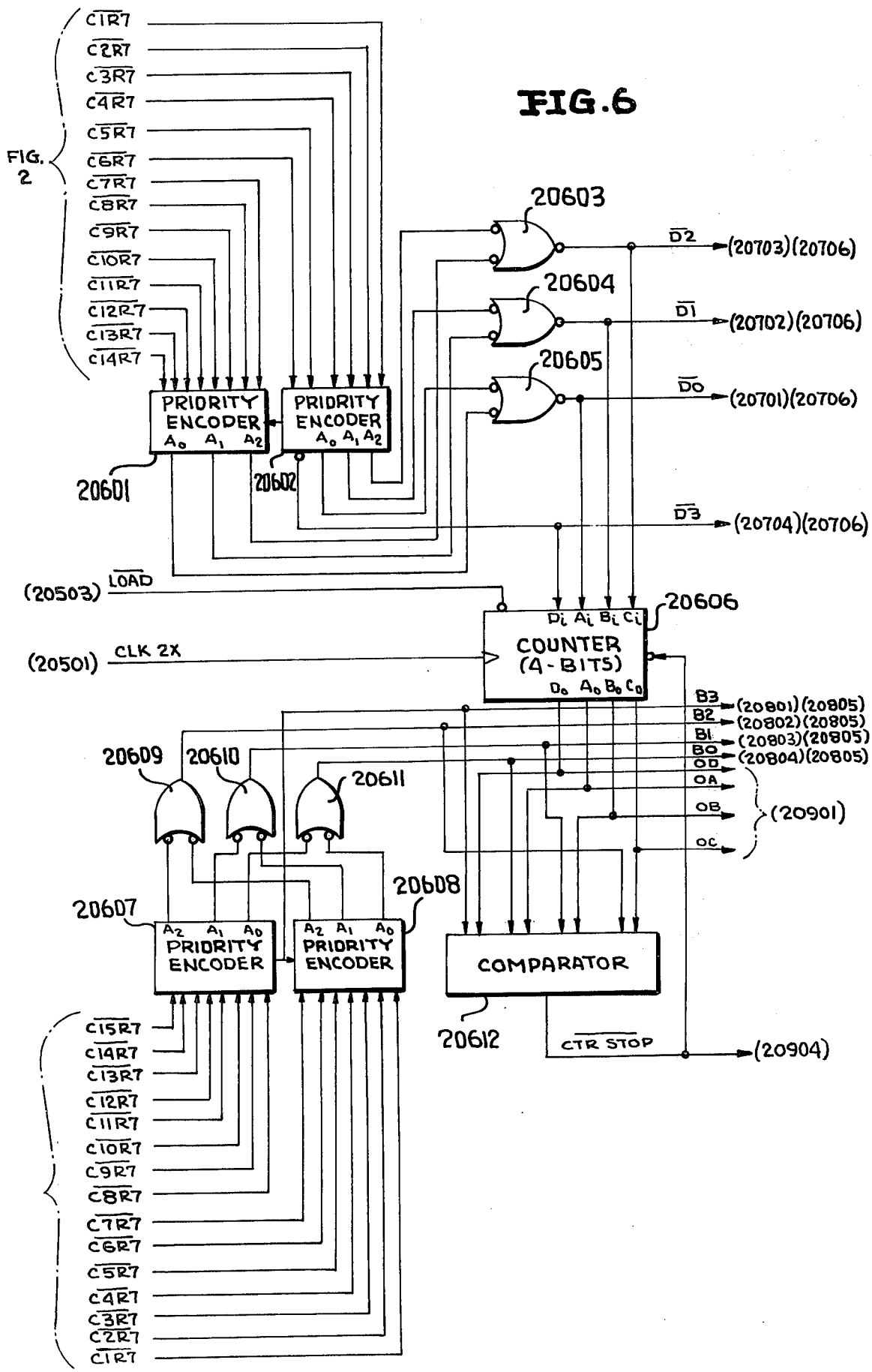

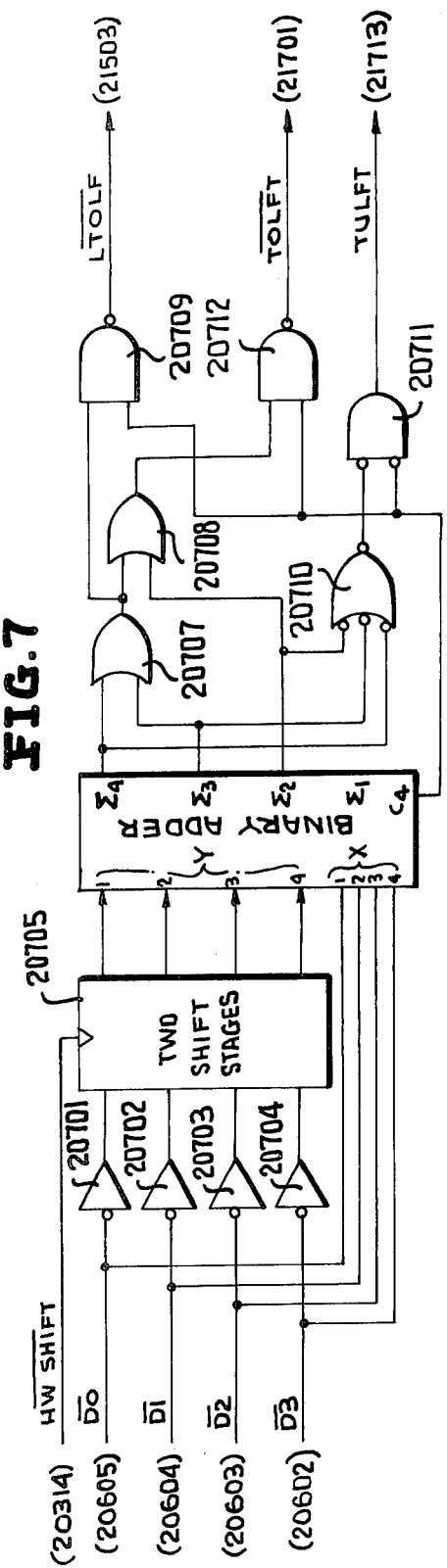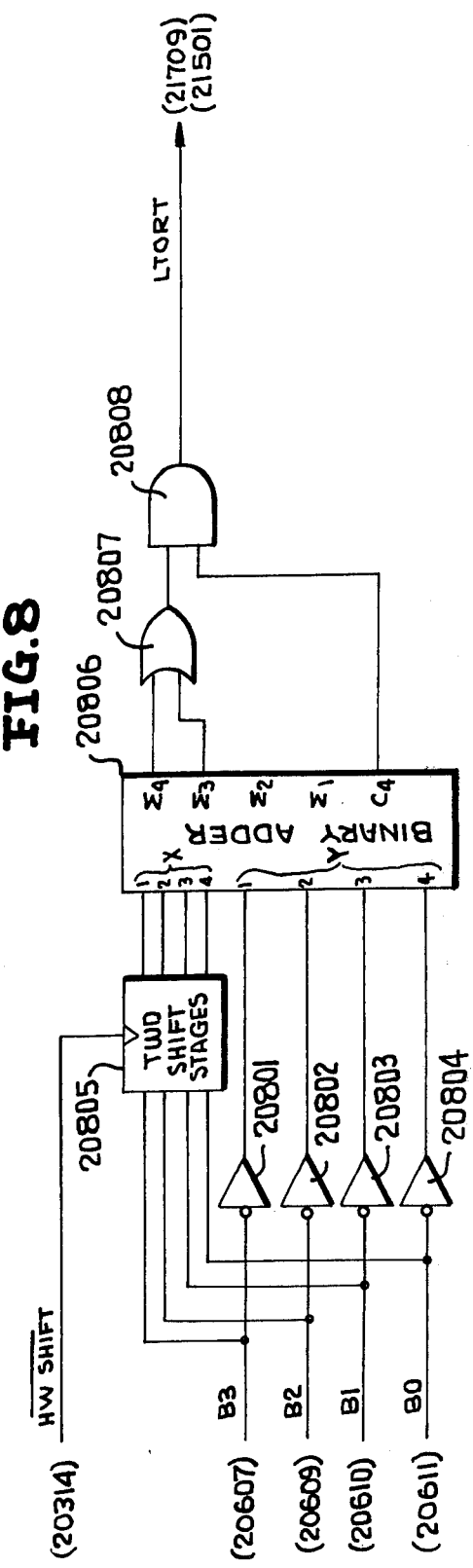

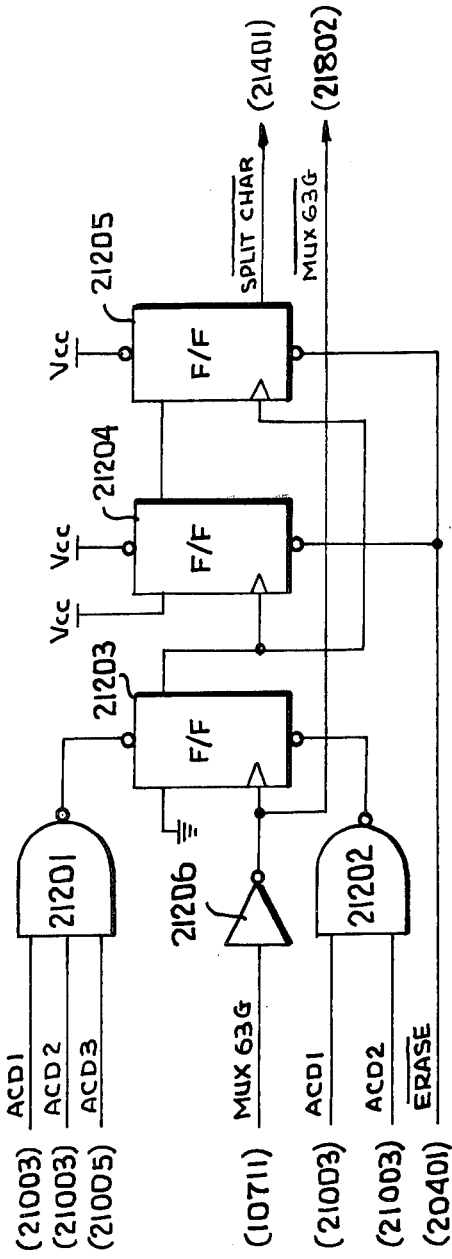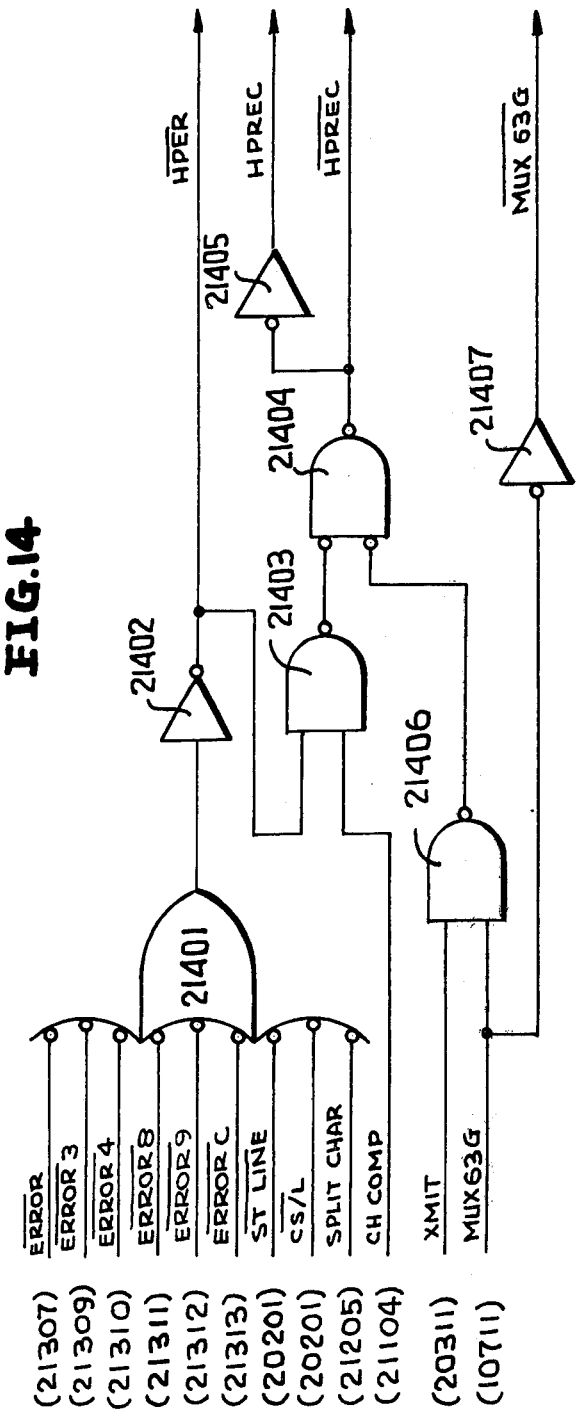
FIG.12
FIG.14

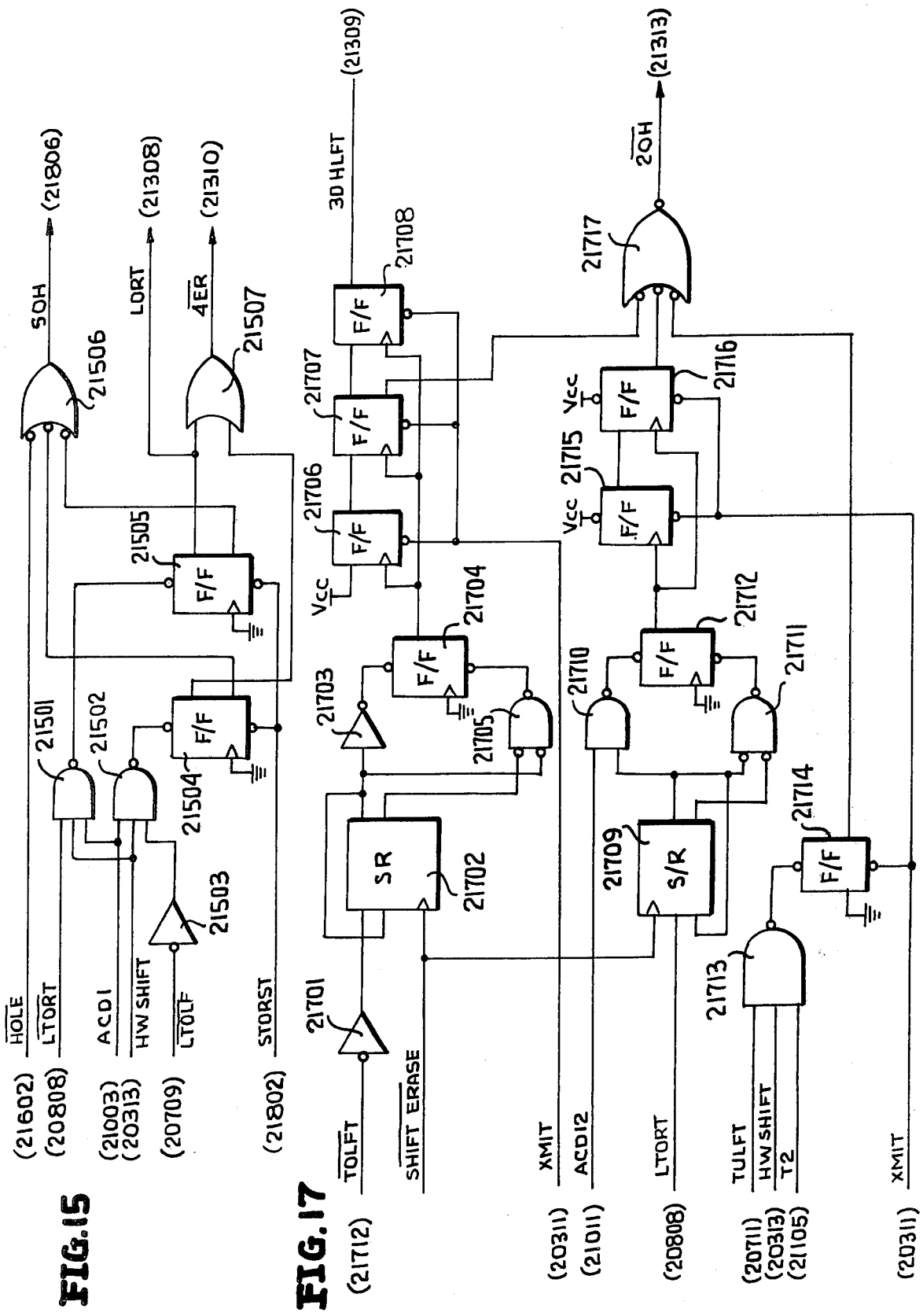

METHOD AND APPARATUS FOR DISCRIMINATING BETWEEN CHARACTERS IN CHARACTER RECOGNITION SYSTEMS

CROSS REFERENCE TO RELATED APPLICATIONS

This application discloses a sub-system portion of the optical character recognition machine disclosed in U.S. Pat. Nos. 3,812,459; 3,848,228; and 3,872,433. Reference to the disclosures in the aforementioned patents are made herein and the entire disclosures of said patents are incorporated herein by such reference.

BACKGROUND OF THE INVENTION

The present invention relates to a method and apparatus for facilitating recognition of characters, particularly handwritten characters, in systems such as optical character recognition machines.

Recognition of handwritten data in prior art optical character recognition machines has presented substantial problems. Unlike standardized machine print which presents characters in a fixed format for relatively straight forward recognition by processing circuitry, handwritten characters can vary substantially from the recommended format in accordance with the care taken by the individual responsible for writing the data. Consequently, both the height and width of handwritten characters can vary significantly from a pre-specified format, in which case recognition by standard prior art optical character recognition machines is impossible.

Although not expressly described in terms of optical character recognition, U.S. Pat. No. 2,964,734 to George P. West describes an electronic handwritten character recognition approach which allows considerable character configuration variation without introducing recognition error. The characters to be recognized by the system of the West patent are transcribed with a substance designed to vary an electrical characteristic such as current conductance, flux permeability or capacitive charge. The sensing device includes a group of sensing elements or electrodes which are arranged to detect predetermined conditions or features in a character configuration. In effect, these electrodes look for line crossings at different locations within the character and decode such line crossings to provide an indication of the character.

The technique described in the aforementioned West patent is for more suitable for use in optical type character recognition machines than the techniques presently used in most such machines. Consequently, the system of which the present invention is a part utilizes a variant of the West approach for handwritten character recognition. Nevertheless, even with this approach there are certain recognition ambiguities which prevail and reduce the recognition accuracy of the system. Some of these ambiguities include recognizing differences between handwritten: 0's and 8's; 0's and 9's; 8's and 9's; 7's and 9's; 7's and 1's; 9's and 1's; 3's and 5's; 3's and 2's; 3's and 8's; and 2's and 7's.

It is therefore an object of the present invention to provide a method and apparatus which eliminates the aforementioned handwritten character recognition ambiguities and thereby improve the recognition accuracy of character recognition machines of any type and particularly of the optical type.

It is a more specific object of the present invention to provide a method and apparatus which is general in application but has particular utility when used in conjunction with the system described in the aforementioned U.S. Patents to provide unusually high reliability in the recognition of handwritten characters.

SUMMARY OF THE INVENTION

In accordance with the present invention, recognition of handwritten characters includes examining each character for holes, overhangs, underhangs and split characters. A hole is defined as a non-character portion bounded on both sides by character portions. Overhangs and underhangs are character segments projecting to the left or right of other segments. A split character is one having two unconnected character segments. For example, a character having a hole cannot be a 1, 2, 3, 5 or 7, and therefore any ambiguity between these characters and 4, 6, 8, 9 and 0 is removed. Likewise, a character having two holes can only be an 8, thereby removing recognition ambiguities between 8 and all other characters. Other resolutions of ambiguities are described herein.

In order to minimize expense and complexity, the examination is performed on characters which are quantized into a grid or matrix of vertical columns and horizontal rows wherein each grid location is represented by a binary signal level dependent upon whether a character portion or a non-character portion exists at that location. The grid is then shifted in parallel columns, one row at a time, into an examination mask which rapidly scans one row at a time for the locations of the left-most and right-most character portions in that row. This information is stored and compared to similar information taken from one or more subsequent rows to determine whether holes, overhangs, underhangs or split characters exist.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a functional block diagram of the recognition circuitry of an optical character recognition machine suitable for use with a specific embodiment of the character recognition approach of the present invention;

FIG. 2 is a functional block diagram of a handwritten character scalar unit used in the machine of FIG. 1;

FIG. 4 is a functional block diagram illustrating the generation of signals representing certain features of a character to be recognized;

FIGS. 5 through 9 are schematic diagrams of individual circuit portions of a character examination mask utilized in a specific embodiment of the present invention; and FIGS. 10 through 18 are schematic diagrams of individual circuit portions of the handwritten decoder unit employed in the described embodiment of the present invention.

DESCRIPTION OF THE PREFERRED EMBODIMENTS

I. General

Figure 3:
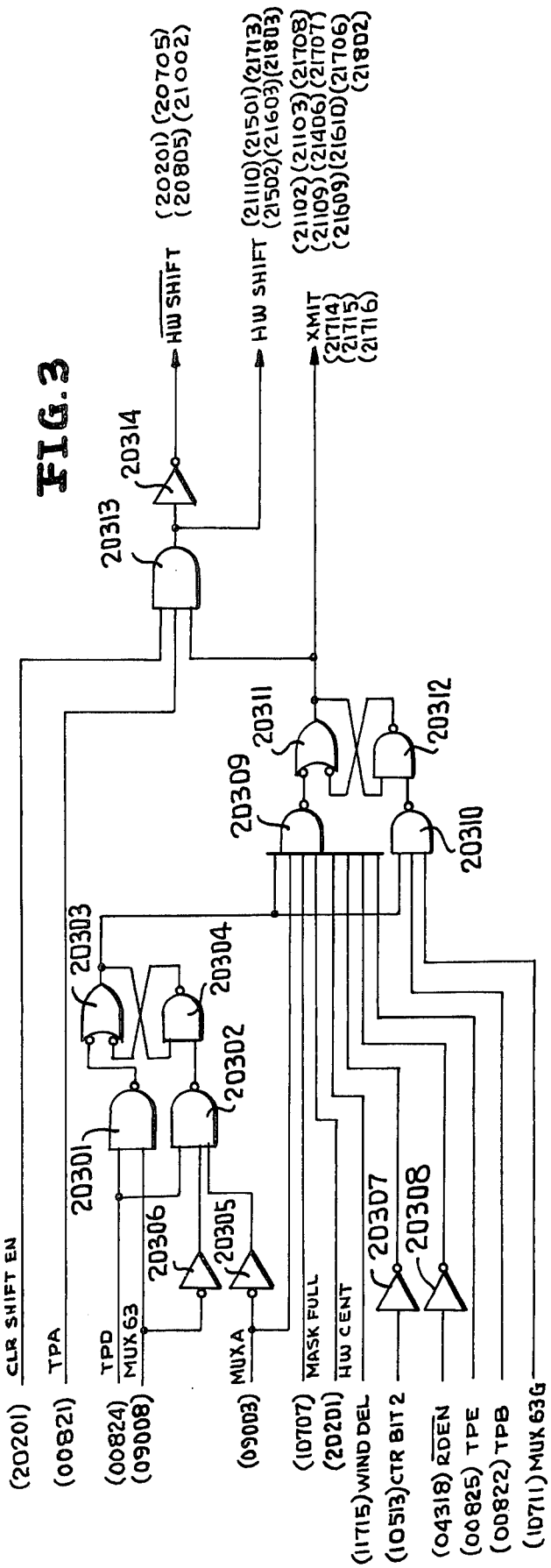
FIG. 3 is a schematic diagram illustrating the generation of certain timing signals utilized in the embodiment of the invention described herein.

The optical character recognition system described herein is part of the same system described in each of the U.S. Patents listed in the CROSS REFERENCE TO RELATED APPLICATIONS section of this application. All of those patents are assigned to the assignee of the present invention and are concerned with the optical components, the document-handling mechanism, system control logic, and character recognition circuitry for an optical character recognition system. The present invention relates to a pre-recognition mode useful in conjunction with handprint recognition whereby certain features on the viewed character are examined and certain decisions made on the basis of that examination to facilitate the recognition process. To this end the circuitry disclosed in FIGS. 2 and 3 herein is intended to replace the circuitry in FIGS. 92 and 96 of the aforementioned U.S. Pat. No. 3,872,433, whereby the system disclosed in that patent can now be rendered capable of processing and recognizing handwritten characters. Numerous references are made herein to components of the system illustrated and described in the aforesaid U.S. Pat. No. 3,872,433, which patent, in its entirety, is expressly incorporated herein by reference.

In order to facilitate signal tracing between the numerous schematic diagrams disclosed herein, and between the schematics herein and those in U.S. Pat. No. 3,872,433, each component illustrated herein, but not in said aforementioned patent, bears a five digit reference numeral in which the first digit is "2," the second and third digits corresponding to the figure number herein in which the element or component is found, and the last two digits identifying that component or element in the figure. An input signal received by an element bears a parenthesized numeral designating the element or component from which that signal originated. Likewise an output signal from an element or component bears the reference numeral of the component or element receiving that signal. Certain signal sources or destinations are located in circuits illustrated in the aforementioned patent; those sources or destinations are designated by a five-digit number having "0" or "1" as a first digit. In either case, the first three digits of the source or destination number identifies a figure number in the patent; the last two digits identify the sending or receiving element in that figure. In this manner, signals may be traced from schematic to schematic and, more particularly, from element to element throughout the entire system.

Particular voltage levels are not specified herein unless necessary to an understanding of the system operation. For ease in reference, however, a convention is employed in which logic one constitutes a relatively high or positive voltage whereas logic zero constitutes a relatively negative or ground voltage.

The drawings in this application and in the aforementioned patent disclose the entire system for purposes of the present application, and signal tracing from drawing to drawing will provide those of ordinary skill in the art with a complete understanding of all functions capable of performance by the system. To facilitate an understanding of the inventive concepts of the present invention, the approach employed herein in describing the system is to describe in detail only those portions of the system which relate to the inventive functions, whereas conventional functions and operations performed by the system are not described in detail. Consequently, while substantially all of the illustrated components bear reference numerals, only those components which relate to the inventive function are described in detail.

It will also be understood by those skilled in the field of character recognition systems that the approach to handwritten recognition described herein can be utilized in the recognition of substantially any handwritten characters. For purposes of facilitating the present description, however, only recognition of numerals 0 through 9 is described in detail.

Referring initially to FIG. 1 of the accompanying drawings, the recognition circuitry of the optical character recognition system is illustrated in functional block form. This block diagram is similar to that in FIG. 2 of the aforementioned U.S. Pat. No. 3,872,433, except that the present handwritten scalar 211 has replaced horizontal and vertical scalar 203, and handwritten mask logic 212 and handwritten decoder 213 have been added. The basic timing for the recognition circuits is illustrated in the timing diagram of FIG. 49 of U.S. Pat. No. 3,872,433. The basic timing for the recognition circuits is controlled by the multiplexer counter located in quantizer and multiplexer 202. The multiplexer counter defines one timing interval, designated herein as a MUX interval, for each six successive master timing pulses. There are 64 MUX intervals for each recognition circuit cycle. During one of the MUX intervals in each 64 interval cycle, the sixty channels of data detected by photo-diode array 201 are sampled and stored in parallel in a register in quantizer and multiplexer unit 202. This data is then transferred in parallel to a shift register from which it is shifted out serially during the remaining 63 MUX intervals (i.e. one shift per interval). The serial data is received at handwritten scalar 211 where it is placed in thirteen columns for machine print recognition and in fifteen columns for handwritten recognition. The columns of shift registers effectively serve to reconstitute the samples or vertical slices of data characters to permit recognition of the machine print characters by mask circuitry at unit 204 and of handwritten characters in handwritten mask logic circuitry 212. The machine print mask circuitry is described in detail in U.S. Pat. No. 3,872,433.

Handwritten recognition and processing begins at the handwritten scalar 211 where the serial data from the quantizer multiplexer 202 is first oriented into 32 shift register columns of 64 bits each in order to accommodate characters of varying widths. The scalar 211 then normalizes the character appearing in the 32 columns, both in height and width, to provide 15 columns (i.e. channels), each column being 24 bits in length. This normalization process is not part of the present invention and is therefore not described in detail herein. These 15 columns of data are examined by the handwritten mask logic 212.

At the handwritten mask logic unit 212 there is provided a fifteen column by eight row mask grid which is time shared to perform different tests on a character progressing through the fifteen column by 24 row shift register matrix. The tests involve determining whether the character passing through the mask has certain features. Different combinations of these features, if present, identify the character being processed. The features tested for include: A top horizontal line; mid-portion horizontal line; bottom horizontal line; and line crossings in the upper left, upper right, lower left and lower right portions of the character. In accordance with the present invention, an examination mask is also provided comprising a single row through which all 15 columns of the character are shifted in parallel. This examination mask examines one row at a time, looking for the left-most and right-most edges of the character and any blanks or non-character portions in between those edges. This information is compared with information in subsequent lines to determine whether specific features (such as holes, overhangs or underhangs) are present in the character being examined. The results of this examination are used in conjunction with test results derived from the handwritten mask logic to resolve possible recognition ambiguities, this resolution being performed, along with evaluation of recognized features, at handwritten decoder 213. Depending on the examination results and the features detected, decoder 213 provides a four-bit output signal which is coded to identify the recognized character. In addition to decoding the test results, the handwritten decoder provides various timing signals to permit time sharing of the handwritten mask and also compares test results to determine if recognition error conditions exist.

The individual circuits represented by blocks 212 and 213 in FIG. 1 are illustrated in detail below.

II. HANDWRITTEN SCALAR

The handwritten scalar 20201 is illustrated in FIG. 2 and performs two main functions. The first of these is to store as much as 32 columns of data, each column being 64 elements high. Thus, an additional 19 columns of 64 bits each are required to supplement the thirteen columns of machine print mask columns illustrated in FIG. 22 of U.S. Pat. No. 3,872,433. The data input signal for the scalar is MUXSD (MUX serial data) which is provided from the quantizer multiplexer 202.

The scalar is capable of reducing the 32 columns and 64 rows of data to a normalized size of 15 columns and 24 rows. Normalization techniques such as this are well known in the prior art and serve the function of providing a character of standard size to the recognition circuitry. Scalar 20201 thus provides 15 signals, $\overline{CHAN\ 1}$ through $\overline{CHAN\ 15}$, representing 15 parallel columns containing twenty-four serial rows. The 15 data columns are clocked out of the scalar, one row at a time, to register 20203 by $\overline{HW\ SHIFT}$ pulses.

In addition, scalar 20201 provides the following control and timing signals:

a. ACD: This signal is derived as a binary OR function of all fifteen channels so that if a character portion appears in any of the fifteen parallel bits of the row being shifted out of the scaler. In this manner, the ACD signal may serve as an indication as to the row in which uppermost portion of the character appears.

b. CS/L: This signal is utilized to indicate that the character being processed is too tall or too short to be properly normalized, a condition whereby recognition is less than optimum. When this signal is binary zero an error condition exists and all recognition operations are terminated.

c. CLR SHIFT EN: This signal is derived during the normalization process and indicates whether or not a particular data pulse should be deleted from or incorporated in the normalized character data. If this signal is binary one, or high, the data should be included.

d. HW CENT: This signal is high if the character is centered in the 32 × 64 data grid.

e. ST LINE: This signal is used to indicate when a straight line (rather than a recognizable character) is present across the grid. If such a line is present, this signal is binary D, or low.

In order to properly orient the 15 data stream for processing purposes, the $\overline{CHAN\ 1}$ through $\overline{CHAN\ 15}$ pulse trains are fed to shift register 20202 where they are delayed for two $\overline{HW\ SHIFT}$ pulses before being provided as the $\overline{CHAN\ 1D}$ through $\overline{CHAN\ 15D}$ pulse trains, respectively. These 15 data pulse trains are fed to 15 respective 8-bit shift registers of the serial in - parallel out type. These are the shift registers which drive the handwritten mask and examination mask logic. Specifically, from the $\overline{CHAN\ 1D}$ data pulse train there are derived the $\overline{C1R0}$ through $\overline{C1R7}$ signals; from the $\overline{CHAN\ 2\ D}$ data train there are derived the $\overline{C2R0}$ through $\overline{C2R7}$ signals; etc. The numeral following the letter "C" designates the column number and the numeral following the letter "R" designates the row number in a 15 × 8 grid comprising the handwritten mask. It will be recognized that the data is shifted parallel by columns, serially by row, through the mask by $\overline{HW\ SHIFT}$ pulses. Since only eight rows of character data can be present in the mask at any time, each character must be interrogated a number of times as it passes vertically through the mask.

Referring to FIG. 3, the HW SHIFT, $\overline{HW\ SHIFT}$ and XMIT signals are utilized to time various events in the handwritten mask and decoder circuits. The HW SHIFT and $\overline{HW\ SHIFT}$ pulses control when the rows are to be shifted. The XMIT signal controls entry of new data into the mask. The circuits to generate these signals are described in the following paragraphs.

A flip flop comprised of NAND gates 20303 and 20304 cycles at half the rate of the MUX 63 pulse train (reference timing diagram in FIG. 49 of U.S. Pat. No. 3,872,433). This flip flop primes gates 20309 and 20310 so that the flip flop formed from gates 20311, 30312 can switch only during alternate MUX 63 intervals. This latter flip flop can be set during such a MUX 63 interval by a TPE pulse only if the following conditions exist to actuate NAND gate 20309:

a. The recognition mask must be full, meaning that a predetermined number of blocks or character portions must be received:

b. The handprint character must be centered in the character grid;

c. There must be a suitable delay subsequent to the previous recognition process (as signified by a high WIND DEL signal);

d. The system must be in a handprint or 7B1 font recognition mode (as indicated by a low CTR BIT 2 signal); and e. The $\overline{RDEN}$ signal must be low.

The flip flop (20311, 20312) is reset by the TPB pulse in the next MUX 63 interval. When this flip flop is set it provides a high XMT pulse. In addition it primes AND gate 20313 so that the next TPA pulse can provide a high HW SHIFT pulse. The inverted $\overline{HW\ SHIFT}$ signal is provided from inverter 20314.

III. HANDWRITTEN MASK LOGIC AND CHARACTER EXAMINATION MASK

The handwritten mask logic and character examination mask are illustrated in FIGS. 4 - 9. The main functions of the handwritten mask logic are the recognition of certain characteristics and features in the characters being processed and the proper control of the data streams in each channel to optimize recognition.

Referring to FIG. 4, the 8 15 × 8 mask data is applied to mask logic 20401. Combinations of bits from different grid locations are employed to test for certain identifying features in characters being shifted through the mask. The character features tested for by the mask logic are as follows:

a. TOP LINE: a horizontal line located at the top of the character;

b. TOP LEFT: a vertical or generally vertical line in the upper left portion of character;

c. TOP RIGHT: a vertical or generally vertical line in the upper right portion of character;

d. BOTTOM LEFT: a vertical or generally vertical line in the lower left portion of character;

e. BOTTOM RIGHT: a vertical or generally vertical line in the lower right portion of character;

f. MID LINE: a horizontal line located proximate the middle of the character; and h. BOTTOM LINE: a horizontal line located at the bottom of the character.

Briefly, the mask is able to make use of only 8 (or in some cases 11) rows of data to recognize features in characters which are 24 bits high in the following manner. When the top of a character reaches the upper portion of the 8 bit high mask, the character is checked for a top line. Four shift counts later (after the character has shifted four positions higher in the mask) a test is made for the presence of lines at the top right and top left sides of the mask. Two more shift pulses later a search is made for a mid portion line, which search continues until the line is found or the bottom of the 24 bit high character reaches the bottom of the 8 bit high mask. When the bottom of the character reaches the bottom of the mask, the search for a bottom line is initiated and the bottom left and bottom right line tests are performed.

The examination logic, with which the present invention is primarily concerned, examines only one row of the handwritten mask (in this case row 7) as the character is shifted through. In other words, the examination mask looks at the entire character, a row at a time. This operation is described in the following paragraphs.

Figure 5:
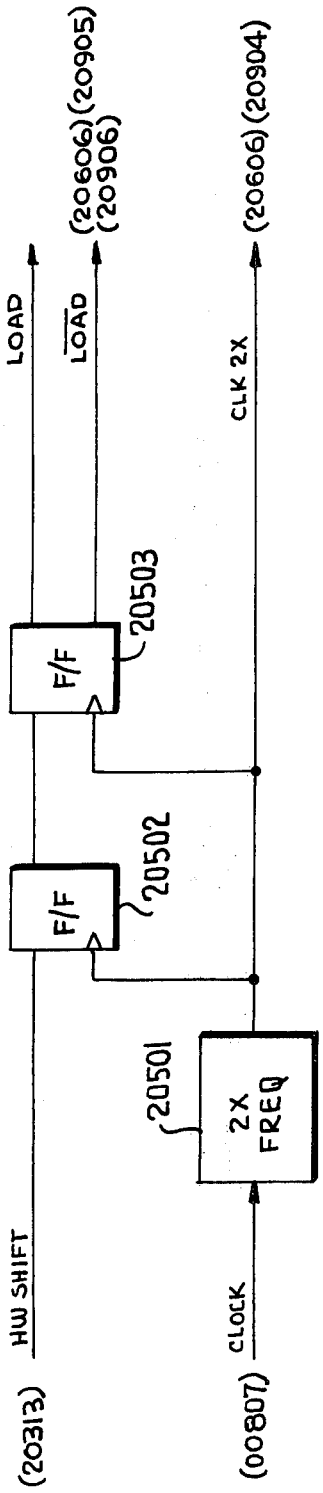

Referring first to FIG. 5, the CLOCK signal (nominally a 3MHz pulse train) is frequency multiplied by a factor of two at frequency multiplier 20501 to provide the CLK 2X signal. This signal clocks flip flops 20502 and 20503 which are connected as a two-stage shift register for the HW SHIFT signal. The set and reset output signals from flip 20503 are the LOAD and $\overline{LOAD}$ signals, respectively, the former being equivalent to the HW SHIFT signal but delayed by two CLK 2X pulses.

Referring now to FIG. 6, the circuitry in this Figure in effect looks for the left-most and right-most character portions of each character row as that row is shifted past row 7 of the handwritten mask. A first pair of priority encoders 20601, 20602 serve to determine the left-most character portion in the row. A priority encoder is a circuit having plural weighted inputs and provides a binary output code corresponding to the highest weighted input receiving an active signal. Specifically, priority encoder 20602 receives the row 7 signals ($\overline{C1R7}$ through $\overline{C6R7}$) of the left-most six columns from shifter register 20203; priority encoder 20601 receives the row 7 signals ($\overline{C7R7}$ through $\overline{C14R7}$) for columns 7 to 14. Since the left-most edge is being sought, the input signals are connected so that the column 1 signal $\overline{C1R7}$ has the highest priority and the column 14 signal $\overline{C14R7}$ has the lowest priority. Thus, if $\overline{C1R7}$ is low, indicating that there is a character portion in that mask location, a particular output code is provided by the encoders, irrespective of the states of the other input signals. If $\overline{C1R7}$ is high, then the closest column in the row having a high signal determines the binary output code. Priority encoders 20601 and 20602 are connected so that if any one of the inputs to encoder 20602 ($\overline{C1R7}$ through $\overline{C6R7}$) is low (meaning that there is a character portion in at least one of these columns), then all of the output code signals from encoder 20601 will remain high irrespective of the states of the $\overline{C7R7}$ through $\overline{C14R7}$ signals. Only if all of the inputs to encoder 20602 are high (no character portions in these columns) will the output code from encoder 20601 represent left-most column containing a character portion. The result of this is that the encoders, in cooperation with gates 20603, 20604 and 20605 provide a four-bit code (signals $\overline{D0}$, $\overline{D1}$, $\overline{D2}$ and $\overline{D3}$) representing the left-most column in the examined row in which there is a character portion present. This four-bit code is used to pre-set a four-bit counter 20606 in response to a $\overline{LOAD}$ command.

Priority encoders 20607 and 20608 are similar in operation to encoders 20601 and 20602 but are connected to give priority to the right-most column having a character portion. Thus, signal $\overline{C15R7}$ has the highest priority while signal $\overline{C1R7}$ has the lowest priority at encoders 20607 and 20608. These encoders cooperate with gates 20609, 20610 and 20611 to provide a four-bit code (signals B0, B1, B2 and B3) corresponding to the right-most column containing a character portion.

The four right edge bits are fed to comparator 20612 where they are compared, bit-for-bit, with the four output bits (OA, OB, OC, OD) from counter 20606. The counter counts the high repetition rate pulses in the CLK2X signal, the counting beginning at the preset number in bits $\overline{D0}$ through $\overline{D3}$ (i.e. — the numbers of the left-most column containing a character portion). The count proceeds from this preset number until it reaches the right-most column number (B0 through B3), at which time comparator 20612 detects a four-bit match and generages a $\overline{CTR\ STOP}$ signal to terminate counting. Counting from the left edge to the right edge of the character row in this manner provides a fast scan period in which each column can be examined in turn for character and non-character portions therein. Such examination is effected in FIGS. 7– 9.

Figure 9:
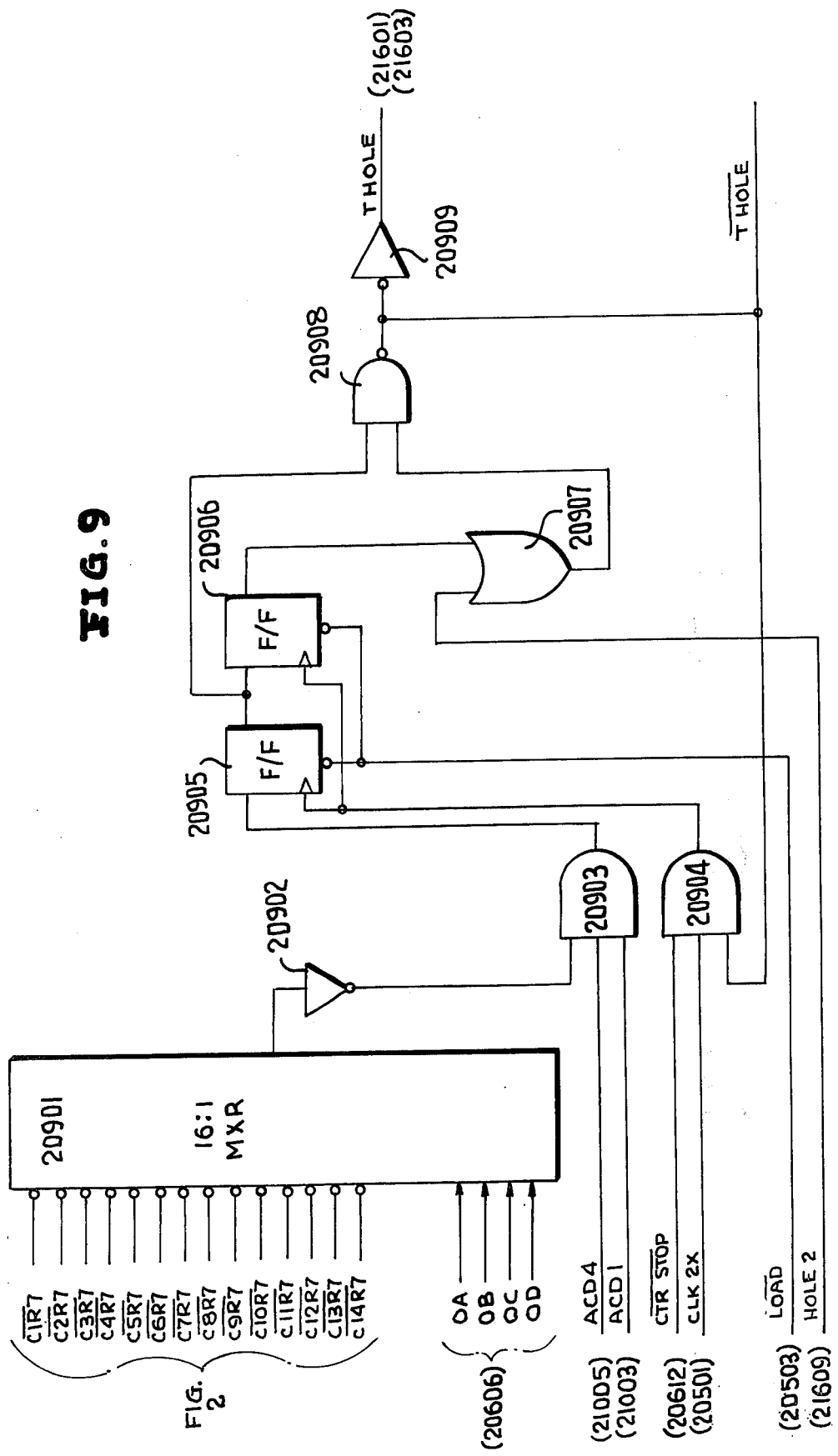

Referring to FIG. 9, the output bits OA, OB, OC and OD from counter 20606 are fed to the select input terminals of a 16 input multiplexer or data selector 20901 (only 14 inputs being used). The data inputs to multiplexer 20901 are row 7, the column signals $\overline{C1R7}$ through $\overline{C14R7}$. Thus, as counter 20606 increments, each of the column signals is successively and individually provided at the output of multiplexer 20901 for examination. If the selected column signal is high (meaning that a non-character portion is in that mask location) a high signal is provided by inverter 20902 to three-input AND gate 20903. Beginning three rows below the top of the character in the mask (as determined by the ACD1 and ACD4 signals), gate 20903 sets flip flop 20905 with the next CLK 2X pulse (via gate 20904). If two successive non-character portions are found (i.e. — no character portion in two adjacent columns, flip flop 20906 is likewise set and provides a T HOLE (temporary hole) signal via OR gate 20907, NAND gate 20908 and inverter 20909. Thus non-character portions in two adjacent columns are temporarily considered to be a hole in the character.

The effect of the recognition of a temporary hole is discussed subsequently. In considering the remaining function of the FIG. 9 circuitry, assume that a hole has been definitely recognized (in the manner to be described in relation to FIG. 16). The HOLE 2 signal is high in such circumstances and primes NAND gate 20909 via OR gate 20908. If in some other row of the same character a single non-character grid location is detected between the character edges, the setting of flip flop 20905 alone (without the need for setting flip flop 20906) produces a second T HOLE pulse. Thus, the criterion for the second hole in a character is only that one column of no character exists between the character edges. This feature is designed into the system because experience has shown that handwritten 8's are often sloppily written with its lowermost hole considerably smaller than its uppermost hole.

After an entire character has been shifted through the examination line mask the $\overline{\text{LOAD}}$ pulse resets flip flops 20905 and 20906 to prepare them for examination of the next character.

Referring to FIG. 7, the binary code $\overline{D0}$, $\overline{D1}$, $\overline{D2}$, $\overline{D3}$, which represents the left-most edge of the character in the row being examined, is inverted by inverters 20701, 20702, 20703, 20704 and passed to shift register 20705 where it is delayed for two $\overline{\text{HW SHIFT}}$ pulses. In other words, the output bits from shift register 20705 correspond to the left-most column containing a character portion in the line which is two lines above the line currently being examined in the FIG. 6 circuit.

The shifted data from shift register 20705 is compared to the current data $\overline{D0}$, $\overline{D1}$, $\overline{D2}$ and $\overline{D3}$ in binary adder 20706 to determine if there is a difference between the left-most character portions in the two lines. The logic gates 20708 through 20712 decode this difference according to the following criteria:

a. A long temporary overhang left $\overline{(\text{LTOLF})}$ condition exists if the left edge of the character in the earlier or shifted line is four or more columns to the left of the present or unshifted line. This would occur in the character "7" for example, where the horizontal top line of the character extends well to the left (overhang left) of the character segment just below it.

b. A temporary overhang left $\overline{(\text{TOLFT})}$ condition, long or short exists if the left edge of the character in the earlier line is at least two columns to the left of the current or unshifted line. This may exist, for example, in the mid-portion of the character "3" wherein the middle horizontal segment of the character may be quite short but overhangs the vertical segment beneath it.

c. A temporary underhang left (TULFT) condition exists if the left edge of the character in the current line is at least two columns to the left of the earlier or shifted line. For example, in the character "3" the middle horizontal line underhangs to the left of the vertical portion immediately above it.

Referring to FIG. 8, the right edge data code B0, B1, B2 and B3, is treated similarly to the treatment of the left edge code in FIG. 7. Sprcifically, bits B0 through B3 are delayed by two $\overline{\text{HW SHIFT}}$ intervals in shift register 20805. These bits are also inverted by inverters 20801 - 20804 and the inverted and delayed codes are compared in binary adder 20806. Gates 20807 and 20808 decode the adder output signals to provide a LTORT signal representing a long temporary overhang right condition. The criterion for this condition to exist is that the right edge of the character in the earlier shifted line is at least four columns to the right of the right edge of the character in the current line. An example of this condition is found in the character "5" where the top horizontal line bears an overhang right relationship to the vertical segment immediately below it.

It must be noted that the criteria (i.e. number of adjacent spaces to determine a temporary hole, the length of overhang or underhang required, etc.) are matters of choice. The important aspect of this invention is the concept of using holes and overhangs per se as recognition criteria, and determining the existence of holes and overhangs by examining a line at a time.

IV. HANDWRITTEN DECODER LOGIC

Figure 10:
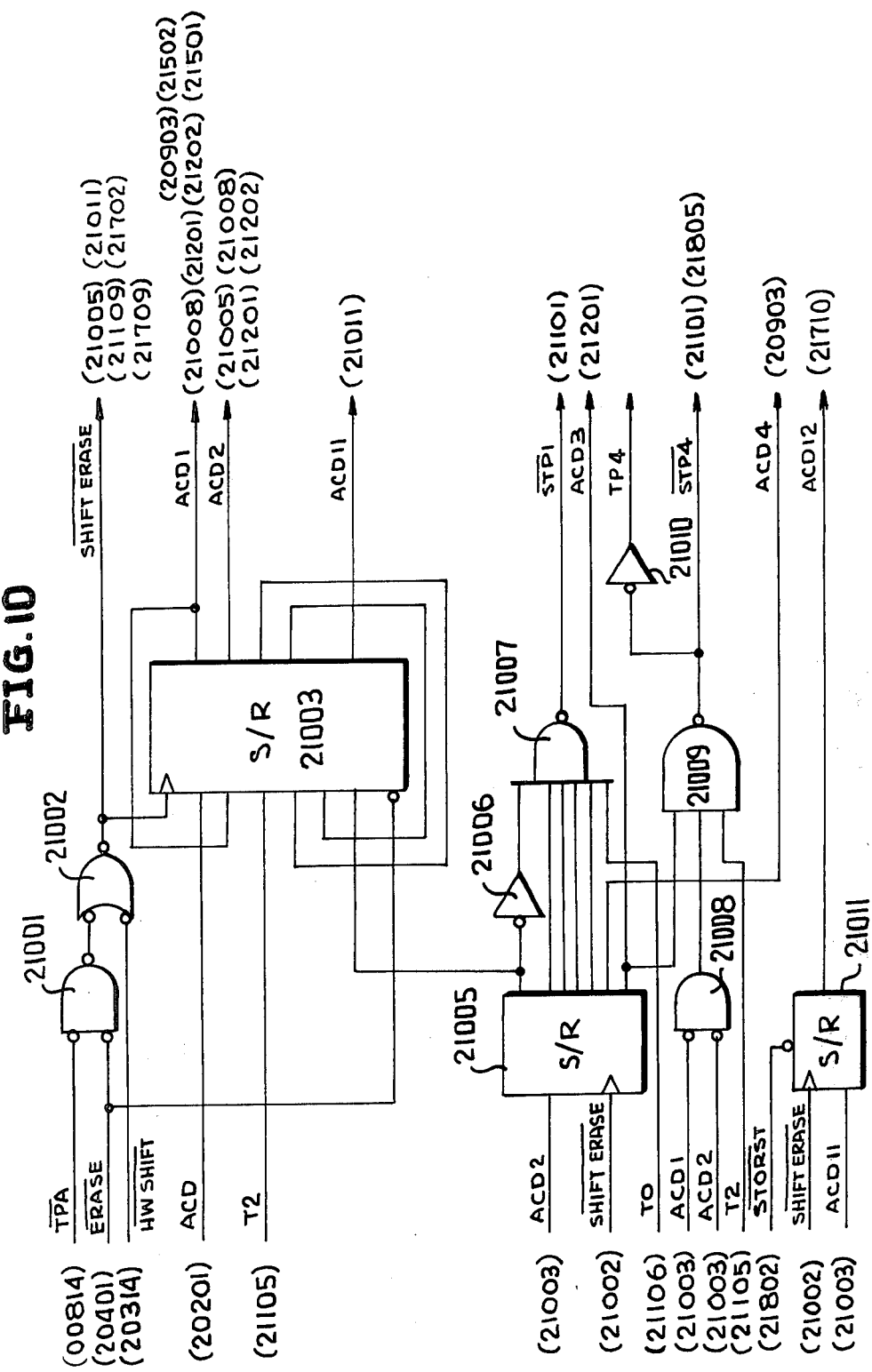

The handwritten decoder logic is illustrated in FIGS. 10 through 18. Various timing and control signals employed in the decoder are generated in the circuits of FIGS. 10 and 11. Referring first to FIG. 10, the ACD signal is binary one if there is a character portion in any column of the row under examination. The ACD signal is sequentially shifted by HW SHIFT signals through shift register 21003, and by $\overline{\text{SHIFT ERASE}}$ signals through shift registers 21005 and 21011 to generate multiple delayed signals ACD1, ACD2, ACD3, ACD4, ... ACD 11 and ACD 12. It should be noted that the $\overline{\text{SHIFT ERASE}}$ pulses are time coincident with the HW SHIFT pulses since the latter are used to generate the former at gate 21002.

The ACD 2 signals are shifted through shift register 21005 by the $\overline{\text{SHIFT ERASE}}$ pulses as long as ACD 2 is high; that is, as long as the character is still entering the mask. Once the entire character has been shifted into the mask, ACD goes low. Two shift pulses after that ACD2 goes low and this low signal is passed progressively through shift register 21005 as the vertical projection of the handwritten character image. When the top of the character image has reached the top of the handwritten mask, the shifted ACD signal is low at the top output terminal of shift register 21005 but high at the second from top output terminal. If there is enough of the image such that the second through fifth terminals from the top are high, the $\overline{\text{STP1}}$ output signal from gate 21007 goes low. Importantly, in order for $\overline{\text{STP1}}$ to go low, the system must be in TO time. TO remains high until a received character image of sufficient height to keep the second through fifth output terminals from the top of shift register 21007 high, has risen up through the shift register to enable gate 21007 and drive $\overline{\text{STP1}}$ low. The following shift pulse causes the top terminal of shift register 21005 to go high, causing the output of gate 21007 to go high.

Figure 11:
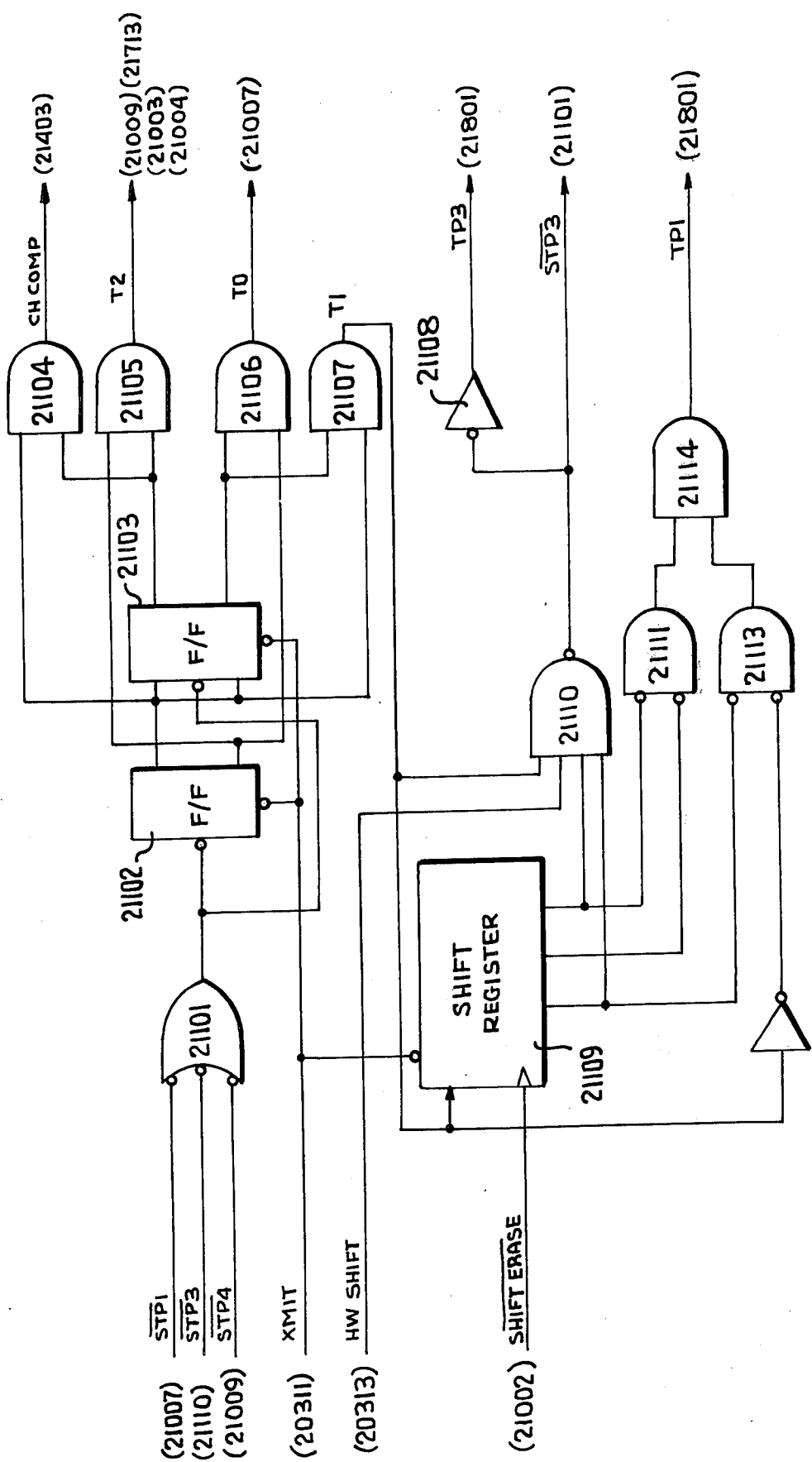

When the $\overline{\text{STP1}}$ signal is high it is fed to OR gate 21101 in FIG. 11 causing the count in previously reset flip flops 21102, 21103 to advance from zero to one. Since flip flops 21102, 21103 are no longer both reset, gate 21106 is inhibited and the TO signal becomes logic 0. The count of one at flip flops 21101, 21102 enables gate 21107 to provide the T1 timing signal. When T1 is high shift register 21109 begins shifting logic ones upon each $\overline{\text{SHIFT ERASE}}$ pulse. From the time T1 goes high until the end of the first $\overline{\text{SHIFT ERASE}}$ pulse, TP1 is high because both inputs to NOR gate 21113 are low. Following the first shift pulse the shift register output to gate 21113 goes high, turning off the TP1 signal at gate 21114. At the fifth shift pulse $\overline{STP3}$ goes low at gate 21110. $\overline{STP3}$, addition to being the signal which is inverted by inverter 21108 to provide TP3, is also fed to gate 21101 where it advances the count in flip flop 21102, 21103 to two. This drives T1 low at gate 21107 and T2 high at gate 21105. With T1 low, further ones shifting at shift register 21109 terminates.

When in timing interval T2, the system waits for the bottom of the character to enter the mask. When the bottom of the character reaches the lower-most input terminal of shift register 21005, the $\overline{STP4}$ signal from gate 21009 goes low. This signal is inverted by inverter 21010 to provide the TP4 signal which interrogates the handwritten mask for the features to be determined at the lower portion of the character. The $\overline{STP4}$ signal also advances the count at flip flops 21102, 21103 from count two to count three in which condition the circuits await the end of transmission before the flip flops and shift registers are reset to zero.

Referring now to FIG. 12, if the character being examined is at least three rows high, gate 21201 sets flip flop 21202. That flip flop in turn drives flip flop 21204 high. If then two successive rows appear with no character portions, gate 21202 resets flip flop 21203. If now three additional successive rows containing character portions appear in the mask, gate 21201 once again sets flip flop 21203 which now, since flip flop 21204 is set and primes flip flop 212905, sets flip flop 21205 to indicate the split character condition. This condition is represented by a low $\overline{SPLIT\ CHAR}$ signal. Thus, if a two character segments at least three rows high are separated by two blank rows, a split character condition exists and the character is not recognized.

Referring now to FIG. 15, ACD1 defines a particular time when a character is in the mask. When ACD1 is present to prime gate 21501 and an overhang right occurs (LTORT goes high), flip flop 21505 is set and provides a high LORT signal. This signal stays high until storage reset time (STORST) which occurs some short time after the Xmit time. That is, the system waits one full vertical scan interval after transmission of data up through the mask before resetting flip flop 21505. The LORT signal is also passed through OR gate 21507 as the $\overline{4ER}$ signal.

Figure 16:
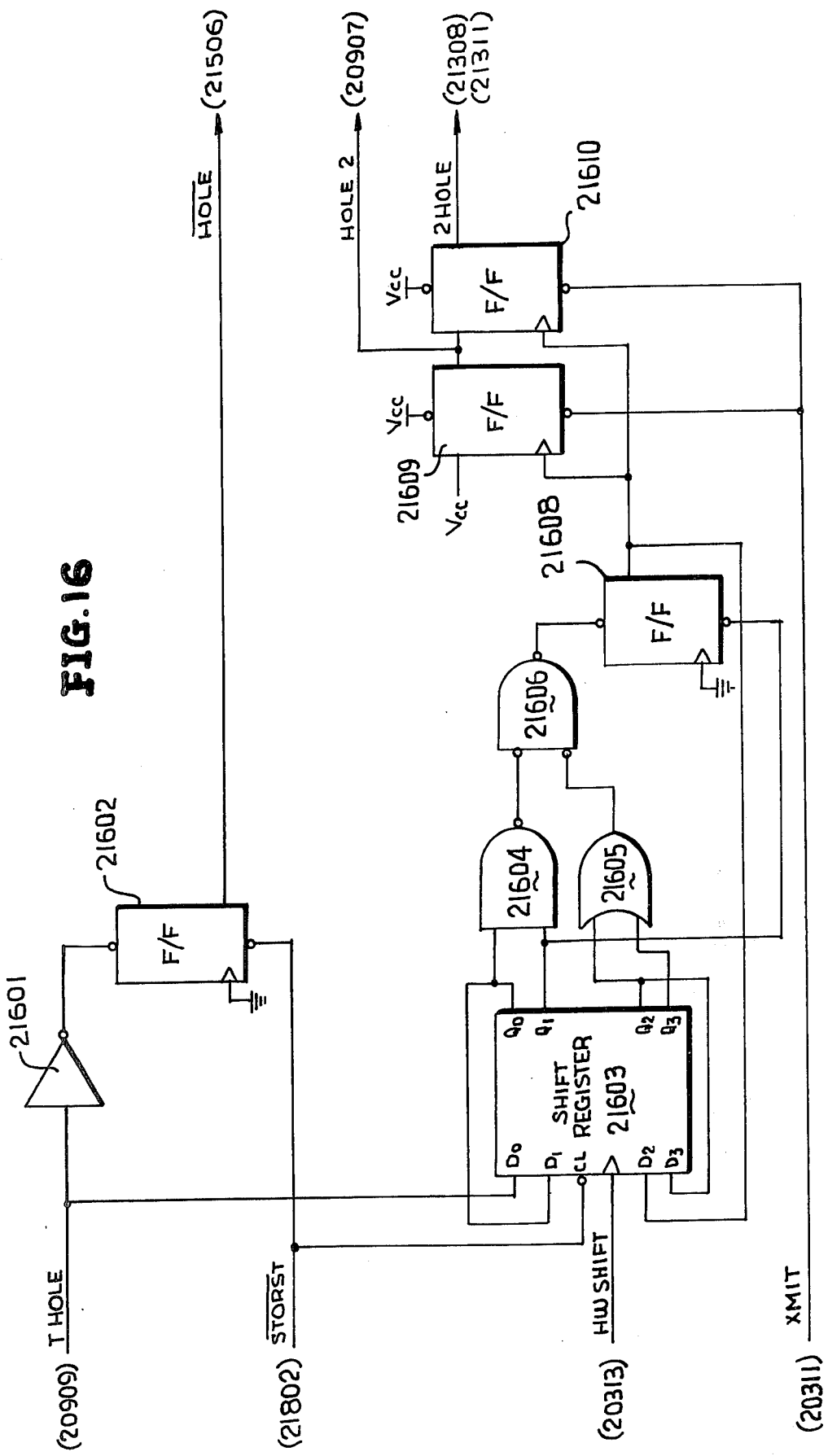

Referring to FIG. 16, if a temporary hole (T HOLE) is detected as described in relation to FIG. 9, flip flop 21602 is set and the $\overline{HOLE}$ signal goes high. This signal is used to indicate that the character being examined is not the character "1," the logic for this being described subsequently.

The T HOLE signal is also applied as a data input the shift register 21603, which is clocked by the HW SHIFT pulses. If a T HOLE is present in two successive rows, the top two output lines $Q_o$, Q, from register 21603 actuate NAND gate 21604 to set hole-detecting flip flop 21608 via gate 21606. This in turn sets flip flop 21609 to provide the HOLE 2 signal. This signal is returned to the examining mask circuitry (FIG. 9) where it indicates that the first hole has been detected in the character being examined so that the next hole need only be one column wide instead of two.

The next character portion, or hole absence, clears the hole-detecting flip flop 21608 after another HW SHIFT interval via the Q1 output signal from shift register 21603. Once cleared, the low set signal from flip flop 21608 is shifted through register 21603 for two more shift intervals to actuate OR gate 21605 and inhibit gate 21606. This has the effect of preventing the hole-detecting flip flop 21608 from being set a second time until at lest three HW SHIFT intervals after it is cleared. In other words, the flip flop does not begin to "look" for the second character hole until the third row after termination of the first character hole. If now a second T HOLE is generated for the character being examined, gate 21604 once again sets flip flop 21608 which now, because flip flop 21609 is set, sets flip flop 21610. This results in a high 2 HOLE signal, indicating that two holes have been detected in the character being examined.

Referring back to FIG. 15, if a temporary long overhang left condition ($\overline{LTOLF}$) is detected when ACD1 indicates there is a character in the mask, NAND gate 21502 sets flip flop 21504. The high output signal from this flip flop is passed through OR gate 21507 to provide the 4ER signal.

Gate 21506 provides a high SOH signal under the following conditions:

a. the $\overline{HOLE}$ signal is low, indicting that there is a hole somewhere in the character being examined; or b. flip flop 21504 is set, indicating that there is a left overhang somewhere in the character; or c. flip flop 21505 is set, indicating that there is a right overhang somewhere in the character. Under these conditions (namely, a hole or overhang present) the character cannot be a 1. Therefore, when SOH is high the character being examined cannot be a 1.

Refrring to FIG. 17, if a short overhang left is detected, the $\overline{TOLFT}$ signal is applied to the data input of shift register 21702 which is clocked by the $\overline{SHIFT\ ERASE}$ signal. Flip flop 21704 is set via inverter 21703 by the shifting of the short overhang indication into the register. If this is followed by two rows without an overhang being detected, flip flop 21704 is reset. Flip flops 21706, 21707 and 21708 are arranged as a three bit shift register to provide a high 30HLFT if three overhang left conditions are detected in a character.

Upon detection of a second overhang left, flip flop 21707 actuates gate 21717 to provide a low $\overline{2OH}$ signal. Gate 21707 is similarly actuated by overhang right and underhang left conditions. Specifically, an overhang right (LTORT) detection is passed through shift register 21709 to set flip flop 21712. Two subsequent rows without overhang right being detected resets flip flop 21712 via gate 21711. The second overhang right sets flip flop 21716 which shifts the high of flip flop 21715 to its output. As a consequence the $\overline{2OH}$ signal at gate 21717 is driven low by the second overhang right. The underhang left condition is examined, at gate 21713, only during time T2 which corresponds to the time when the bottom half of the character is passing through the handwritten mask. Thus, the circuit looks for an underhang left at the bottom of the character. Detection of any underhang left sets flip flop 21714 to actuate gate 21717 and drive $\overline{2OH}$ low.

Figure 13:
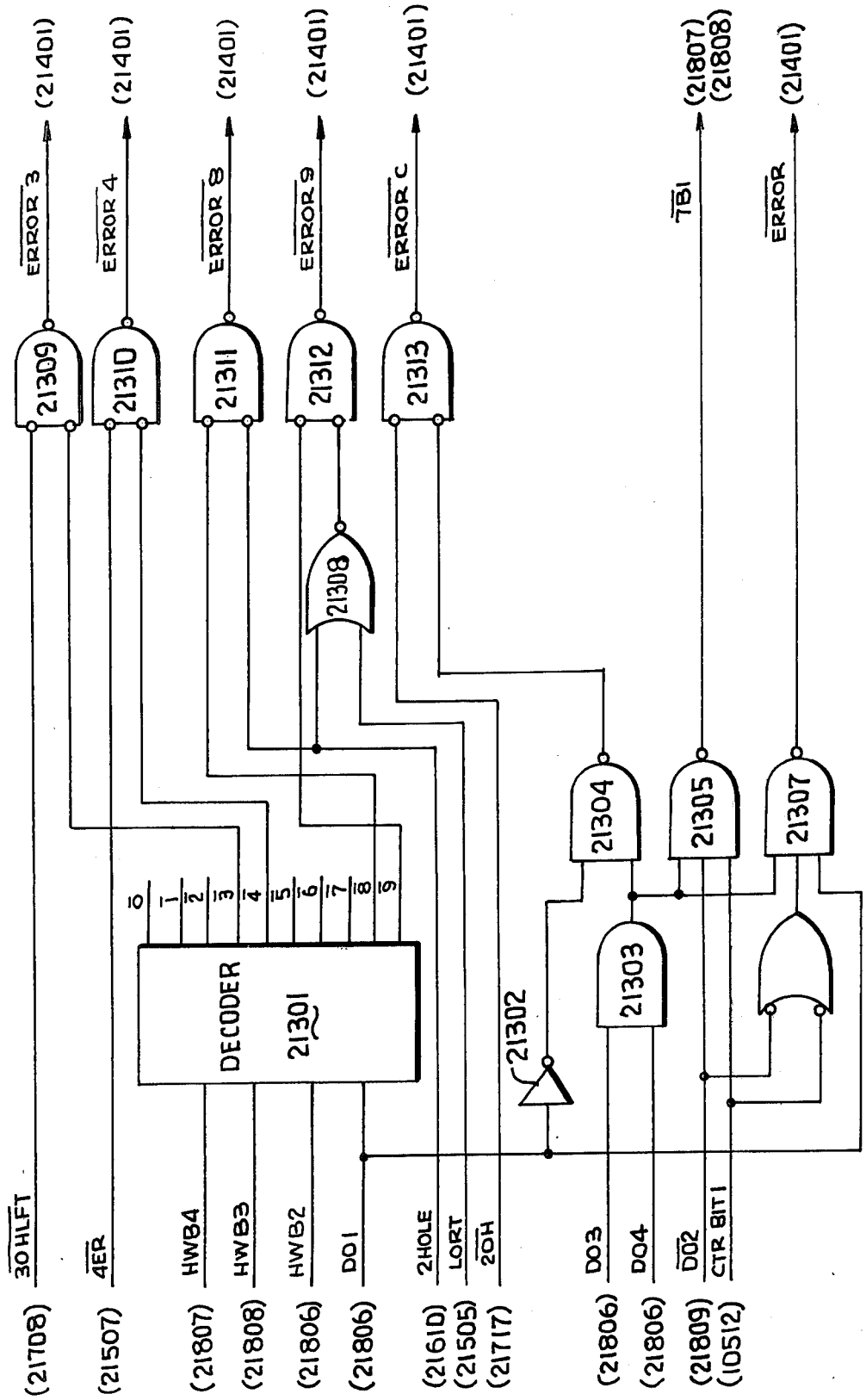
Figure 18:
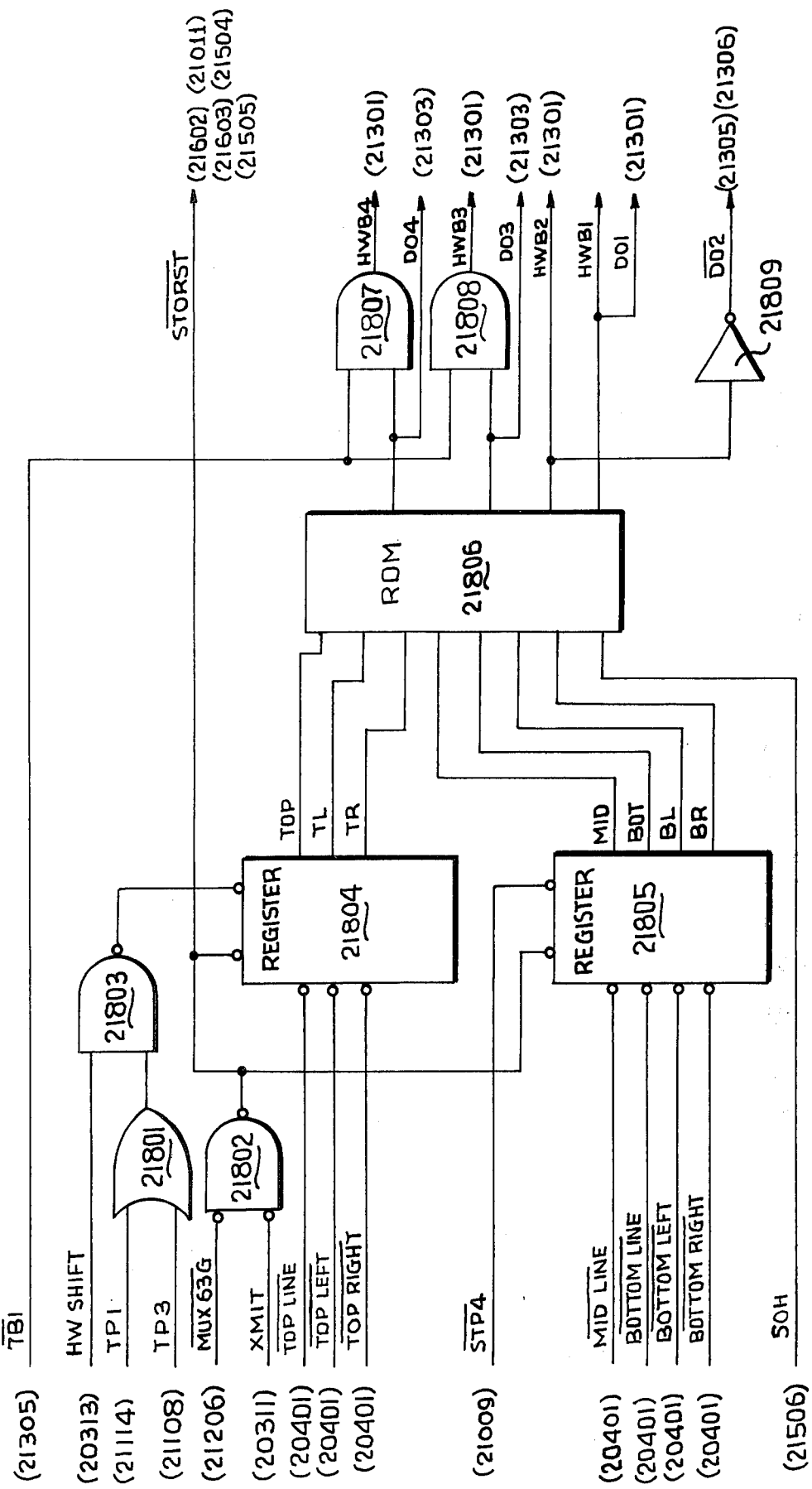

Referring now to FIG. 13, decoder 21301 receives a four-bit binary code (DO1, HWB2, HWB3, HWB4) representing the identity of the character recognized by the circuit of FIG. 18. The decoder provides a low output signal on one of ten output lines corresponding to the four-bit coded input. Thus, if the handwritten mask detects features which cause the circuit of FIG. 18 to indicate recognition of a 3, the $\overline{3}$ output of decoder 21301 goes low and is applied to gate 21309. If the $\overline{3OHLFT}$ signal applied to that gate is low, indicating that three overhang lefts have been detected in the character being examined, then the ERROR 3 is high, thereby allowing the system to recognize a 3. In other words, if there are not three detected overhang lefts then a 3 cannot be recognized, regardless of what the hand-written mask has determined.

Similar preclusions of recognition exist. For example, if the $\overline{4}$ output of decoder 21301 is low, indicating that the handwritten mask has recognized a 4, the 4 will not be recognized unless there has been an overhang left or no overhang right recognized, as represented by signal 4ER being high at gate 21310. Likewise, if an 8 is to be recognized, there must be two holes detected in the character as indicated by the 2 HOLE signal at gate 21311. If a 9 is to be recognized there must not be two holes detected nor may there be an overhang right detected, as controlled by the 2 HOLE and LORT signals at gates 21308 and 21312. Similarly, a C cannot be recognized if the examination has detected two overhang lefts, or two overhang rights, or an underhang left, all as represented by the $\overline{2OH}$ signal. In this regard it is noted that in addition to recognizing the ten numerals, the system as disclosed is also capable of recognizing the letter C. Letter C is recognized by gates 21303, 21304, depending on the state of bits DO1, DO3 and DO4 in the character recognition code. But the C character cannot be recognized if the $\overline{2OH}$ is low.

Other signals generated in the circuit of FIG. 13 are the $\overline{7B1}$ and $\overline{ERROR}$ signals. The $\overline{7B1}$ signal relates to font selection in the system and forms no part of the present invention. The $\overline{ERROR}$ signal is generated by gates 21306 and 21307 to indicate that the recognition code bits have resulted in a meaningless code, thereby creating an error condition.

Referring to FIG. 14, all of the ERROR signals (including the $\overline{ST\ LINE}$, CS/L, and SPLIT CHAR signals) are combined in a negative OR function at gate 21401 to produce a positive going signal which is inverted by inverter 21402 to provide a low $\overline{HPER}$ signal (handprint errors) in the error condition. Therefore, if there has been an erroneous recognition of a 3, 4, 8, 9 or C by the handwritten mask, or if the recognition code is faulty, or if there is a split character, a horizontal line extending across the character, or a too short or too long for the mask, a handprint error condition exists and the character is not recognized.

If no ERROR signal is generated, the HPREC (hand print recognize) is permitted to go low. Specifically, gate 21403 primes one input to gate 21404 at CH COMP time. At MUX 63G time during that XMIT interval gate 21404 is therefore enabled to provide the low $\overline{HPREC}$ signal and cause inverter 21405 to provide the high HPREC signal. If any error is detected, gate 21404 is inhibited, inhibiting the indication of any recognition of a handwritten character, and at the same time the $\overline{HPER}$ (hand print error) signal goes low.

Referring to FIG. 18, the handprint recognition code is generated with the aid of a read only memory 21806. The various characteristics and features detected in the handwritten mask logic of FIG. 4 are temporarily stored in registers 21804 and 21805 which are clocked at the appropriate times with the aid of gates 21801, 21802 and 21803. The combination of features which are detected serve as an address code for the read only memory which responds by providing a four-bid handprint recognition code (DO1 through DO4) corresponding to the character having the combination of features which were detected. The SOH signal is employed to inhibit the recognition of a 1 character if some overhang has been detected.

The $\overline{STORST}$ signal is generated at gate 21802 at the negative time coincidence of the $\overline{MUX\ 63G}$ signal and the low XMIT signal.

The invention as disclosed involves testing a character to determine whether or not it contains holes, overhangs or underhangs. This information is used in the described embodiment to rule out certain characters which the handwritten mask may otherwise recognize. However, if desired, the information could be used to effect positive character recognition irrespective of handwritten mask determination. Thus, where the presence of an overhang or hole is used to preclude recognition of the 1 character, it is certainly within the scope of this invention to use the absence of a hole, overhang or underhang to force recognition of the 1 character. Likewise, while the disclosed embodiment prevents recognition of a 3 unless three overhang lefts are detected, detection of three overhang lefts combined with no detected holes could force recognition of a 3.

Irrespective of whether the detection of holes, underhangs and overhangs is used to preclude recognition or force recognition, it is clear that detection of these features resolves numerous ambiguities in character recognition and renders the overall recognition process far more accurate. For example, many character recognition systems, in looking only for character segments in certain areas of the mask, confuse the characters 0 and 8. The present invention completely resolves this ambiguity by virtue of the fact that 0 has only one hole while the 8 has two. Likewise, many recognition systems have ambiguities between 3's and 5's, particularly where a sloppily written 5 has its upper vertical portion slanted so that it is at least partly located in the upper right corner of the handwritten mask. This ambiguity is eliminated by the present invention because the 3 has three overhang lefts whereas the 5 only has two. The resolution of ambiguity between 8 and 9 is easily made because the 8 has two holes whereas the 9 has only one. The ambiguity between 7 and 9 is now easily resolved because the 9 has a hole whereas the 7 does not. The ambiguity between 0 and 9 is now resolved because 9 has an overhang left whereas 0 does not. There are numerous other recognition ambiguities which are readily resolved by recognizing holes, overhangs and underhangs.

Apart from the concept of recognizing holes, overhangs and underhangs per se, another important feature of the present invention relates to the examination technique employed. Specifically, as the character is shifted upward in parallel columns, a row at a time, through the handwritten mask, one row at a time is examined. The examination of that row involves detecting the left-most column containing a character portion, the right-most column containing a character portion, and whether any non-character portions exist between the detected edges. The locations of the detected edges are then compared in different rows. The existence of holes, overhangs and underhangs is then ascertained from these tests. By detecting the features on one row at a time, using a fast clock scanning technique, the tests can be made without slowing up the handwritten mask operation yet with a minimum of additional circuitry, complexity and cost.

It should be particularly noted that the various criteria for applying the detected holes, overhangs and underhangs to resolve character ambiguity can be varied considerably. Further, the criteria for actually detecting the holes, overhangs and underhangs can be varied so that any number of adjacent grid locations without character segments can be determinative of a hole, overhang or underhang condition.

While I have described and illustrated one specific embodiment of my invention, it will be clear that variations of the details which are specifically illustrated and described may be resorted to without departing from the true spirit and scope of the invention as defined in the appended claims.

I claim:

1. In a character recognition system of the type wherein a character fascsimile, in the form of electrical signals, is examined for purposes of identification, said character being superposed on a grid, wherein said electrical signals are binary levels representing respective grid locations in which the presence of a character portion is represented by one binary level and the absence of a character portion is represented by another binary level, said grid locations being arranged in a plurality of vertical columns and horizontal rows, a method for improving character identification reliability comprising the steps of:
shifting a row at a time of said binary signals into an examination mask in the form of a shift register having as many storage locations as there are binary signals in a row;
simultaneously examining the entire row of binary signals in said examination mask to determine the left-most and right-most storage locations containing a character portion; and
sequentially interrogating only the grid locations in the examined row which lie between said left-most and right-most storage locations to determine the presence and absence of character portions.

2. The method according to claim 1 further comprising the step of:
in response to detecting an absence of character portions in a predetermined number of adjacent storage locations, storing an indication that a hole may be present in the character, wherein a hole is defined as the absence of character portions in one or more grid locations entirely surrounded by grid locations having character portions therein.

3. The method according to claim 1 further comprising the steps of:
temporarily storing position data of said left-most and right-most storage locations in each examined row;
providing a no-hole indication when all interrogated storage locations in an examined row contain only character portions; and
providing an indication when said left-most storage location of one examined row having no hole is further left than said left-most storage location of another examined row having no hole in the same character.

4. The method according to claim 1 further comprising the steps of:
temporarily storing position data of said left-most and right-most storage locations in each examined row;
providing a no-hole indication when all interrogated storage locations in an examined row contain only character portions;
providing an indication when said right-most storage location of one examined row having no hole is further right than said right-most storage location of another examined row having no hole in the same character.

5. In a character recognition system of the type wherein a character facsimile, in the form of electrical signals, is examined for purposes of identification, said character being superposed on a grid, wherein said electrical signals are binary levels representing respective grid locations in which the presence of a character portion is represented by one binary level and the absence of a character portion is represented by another binary level, said grid locations being arranged in a plurality of vertical columns and horizontal rows, apparatus for improving character identification reliability comprising:
an examination mask including register means for temporarily storing a number of binary signals at least equal to the number of grid locations in a grid row;
shift means for shifting a row at a time of said number of binary signals into said examination maskl
means for simultaneously examining the entire row of binary signals in said examination mask to determine the left-most and right-most grid locations containing a character portion in the examined row;
means for sequentially interrogating only the grid locations in the examined row which lie between said left-most and right-most grid locations to determine the presence and absence of character portions; and
means responsive to the absence of character portions in a predetermined number of successively interrogated grid locations for storing indicia of a possible hole in the examined row.

6. The apparatus according to claim 5 further comprising:
means for comparing said indicia for successive examined rows;
means responsive to the absence of character portions in at least a predetermined number of successive examined rows for indicating the pressure of a hole in the character being examined.

7. The apparatus according to claim 6 further comprising:
means for temporarily storing position data of said left-most and right-most grid locations for each examined row;
means for providing and storing a no-hole indication when the interrogated grid locations of an examined row contain only character portions; and
logic means for comparing the stored position data and stored no-hole indications to provide an indication when said left-most grid location of an examined row having no hole is further left than said left-most grid location of another examined row having no hold on the same character.

8. The apparatus according to claim 7 wherein said another examined row is a subsequently examined row, and further comprising:
further logic means for providing a further indication when said left-most grid location of an examined row having no hole is further left than said left-most grid location of a previously examined row having no hole in the same character.

9. The apparatus according to claim 7 further comprising:
additional logic means for providing an additional indication when said right-most grid location of an examined row having no hole is further right than said right-most grid location of another examined row having no hole in the same character.

10. The apparatus according to claim 6 further comprising:
  means for temporarily storing position data of said left-most and right-most grid locations for each examined row;
  means for providing and storing a no-hole indication when the interrogated grid location of an examined row contain only character portions; and
  logic means for comparing the stored position data and stored no-hole indications to provide an indication when said right-most grid location of an examined row having no hole is further right than said right-most grid location of another examined row having no hole in the same character.

11. The apparatus according to claim 5 wherein said means for simultaneously examining comprises:
  first priority encoder means, connected to receive said binary signals in the examined row, for providing a signal representing the location in the examined row of said left-most binary signal having said one binary level; and
  second priority encoder means connected to receive said binary signals in the examined row, for providing a signal representing the location in the examined row of said right-most binary signal having said another binary level.

12. In a character recognition system of the type wherein a character facsimile, in the form of electrical signals, is examined for purposes of identification, said character being superposed on a grid, wherein said electrical signals are binary levels representing respective grid locations in which the presence of a character portion is represented by one binary level and the absence of a character portion is represented by another binary level, said grid locations being arranged in a plurality of vertical columns and horizontal rows, apparatus for improving character identification reliability comprising:
  an examination mask including register means for temporarily storing a number of binary signals at least equal to the number of grid locations in a grid row;
  shift means for shifting a row at a time of said number of binary signals into said examination mask;
  means for simultaneously examining the entire row of binary signals in said examination mask to determine the left-most and right-most grid locations containing a character portion in the examined row;
  means for sequentially interrogating only the grid locations in the examined row which lie between said left-most and right-most grid locations to determine the presence and absence of character portions;
  means responsive to the presence of character portions in all of the interrogated grid locations for providing and storing a no-hole indication;
  means for storing position data of said left-most and right-most grid locations for each examined row; and
  logic means for comparing the stored position data and stored no-hole indications to provide a further indication when said left-most grid location of an examined row having no hole is further left than said left-most grid location of another examined row having no hole in the same character.

13. In a character recognition system of the type wherein a character facsimile, in the form of electrical signals, is examined for purposes of identification, said character being superposed on a grid, wherein said electrical signals are binary levels representing respective grid locations in which the presence of a character portion is represented by one binary level and the absence of a character portion is represented by another binary level, said grid locations being arranged in a plurality of vertical columns and horizontal rows, apparatus for improving character identification reliability comprising:
  an examination mask including register means for temporarily storing a number of binary signals at least equal to the number of grid locations in a grid row;
  shift means for shifting a row at a time of said number of binary signals into said examination mask;
  means for simultaneously examining the entire row of binary signals in said examination mask to determine the left-most and right-most grid locations containing a character portion in the examined row;
  means for sequentially interrogating only the grid locations in the examined row which lie between said left-most and right-most grid locations to determine the presence and absence of character portions;
  means responsive to the presence of character portions in all of the interrogated grid locations for providing and storing a no-hole indication;
  means for storing position data of said left-most and right-most grid locations for each examined row; and
  logic means for comparing the stored position data and stored no-hole indications to provide a further indication when said right-most grid location of am examined row having no hole is further right than said right-most grid location of another examined row having no hole in the same character.

* * * * *